United States Patent [19]

Hamilton et al.

[11] 4,141,484

[45] Feb. 27, 1979

[54] METHOD OF MAKING A METALLIC STRUCTURE BY COMBINED FLOW FORMING AND BONDING

[75] Inventors: C. Howard Hamilton, Thousand Oaks; Leonard A. Ascani, Palos Verdes Estates, both of Calif.

[73] Assignee: Rockwell International Corporation, El Segundo, Calif.

[21] Appl. No.: 708,530

[22] Filed: Jul. 26, 1976

[51] Int. Cl.² .................. B23K 19/00; B21C 23/22
[52] U.S. Cl. .................... 228/265; 228/173 A; 228/193; 72/364
[58] Field of Search .............. 228/141, 173 A, 193, 228/265; 72/364

[56] References Cited

U.S. PATENT DOCUMENTS

| | | | |
|---|---|---|---|
| 3,535,762 | 10/1970 | Taylor | 228/141 X |
| 3,535,908 | 10/1970 | Hymes et al. | 228/173 A |
| 3,537,171 | 11/1970 | Wilson et al. | 228/114 |
| 3,920,175 | 11/1975 | Hamilton et al. | 228/173 A |
| 3,996,019 | 12/1976 | Cogan | 228/193 X |
| 4,023,389 | 5/1977 | Dibble et al. | 72/364 |

*Primary Examiner*—Al Lawrence Smith
*Assistant Examiner*—K. J. Ramsey
*Attorney, Agent, or Firm*—Charles T. Silberberg

[57] ABSTRACT

A method for fabricating metallic structures, especially those having intricate shapes, utilizes a combination of flow forming and bonding. A metal preform having flow forming characteristics is positioned relative to a shaping member and a metal workpiece to be joined to the preform. The preform is heated to a temperature range suitable for flow forming. Pressure is applied to cause the preform to flow form against the shaping member and the workpiece. The preform and workpiece are maintained under coordinated temperature-pressure-time duration conditions to produce metallurgical bonding of the preform to the workpiece.

9 Claims, 4 Drawing Figures

METHOD OF MAKING A METALLIC STRUCTURE BY COMBINED FLOW FORMING AND BONDING

BACKGROUND OF THE INVENTION

The present invention relates to a process for fabricating metallic structures utilizing flow forming and bonding. Flow forming is a process where a part is formed by the use of heat and compressive pressure. It is to be distinguished from superplastic forming where parts are drawn under tensile stress. The part to be formed is placed within tooling and heated to the temperature at which the part material becomes plastic. Pressure is then applied to the tooling to flow the part material into the shape dictated by the tooling. The major object of the flow forming process is to form a structure to substantially net shape to thereby reduce conventional machining and obviate the need where possible for a plurality of parts which must be joined to form the final structure.

A method of flow forming is described in U.S. Pat. No. 3,519,503 to Moore, et al. In this method, high strength alloys are heated to a temperature placing them in a condition of low strength and high ductility and forged in hot dies to a desired shape. However, with such state of the art flow forming methods, limited hardware configurations are available. It is normally quite difficult, if not impossible, to fabricate some hardware designs such as thin webs and stiffeners using state of the art flow forming (also known as hot die forging) processes because of the difficulty in causing the material to flow into narrow cavities or thin sections or other desirable design configurations. For some parts, it is necessary with state of the art methods to produce special preform configurations to assure that the finished part can be readily produced in the final operation. Such preforms require either machining or preform dies and add cost to the finished part.

SUMMARY OF THE INVENTION

It is, therefore, an object of the present invention to efficiently fabricate metallic structures having difficult configurations or intricate shapes.

It is another object of the present invention to make metallic structures in a single operation by a combination of flow forming and bonding.

It is yet another object of the present invention to flow form a metal preform against a shaping member and workpiece such that the metal workpiece is bonded to the preform to form the desired structure.

It is still another object of the present invention to make a metallic structure from a preform and metal workpiece by combining flow forming and bonding, thereby reducing the time, raw material usage, cost, structure weight, and fatigue weakness in fabricating and mechanically fastening the multiple components of a structure.

Briefly, in accordance with the invention, there is provided a method for making a metallic structure by combining flow forming with bonding. A metal preform having flow forming characteristics, a shaping member, and a metal workpiece to be joined to the preform, are positioned relative to one another. The preform is heated to within a temperature range suitable for flow forming of the preform. Pressure is applied to the preform to cause it to flow form against the shaping member and the workpiece. The preform and workpiece are maintained under coordinated temperature-pressure-time duration conditions suitable for metallurgical bonding of the preform to the workpiece. Optimally, the metallurgical bonding of the preform to the workpiece is by diffusion bonding.

In a particular embodiment of the invention, the preform and workpiece are heated to within a temperature range suitable for the flow forming of the preform and sufficient for metallurgical bonding of the preform to the workpiece.

In another particular embodiment of the invention, the temperature range suitable for the flow forming of the preform is also suitable for the flow forming of the workpiece, and the preform and workpiece flow form against the shaping member and one another.

Other objects and advantages of the invention will become apparent upon reading the following detailed description and upon reference to the drawings.

While the invention will be described in connection with the preferred embodiment, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
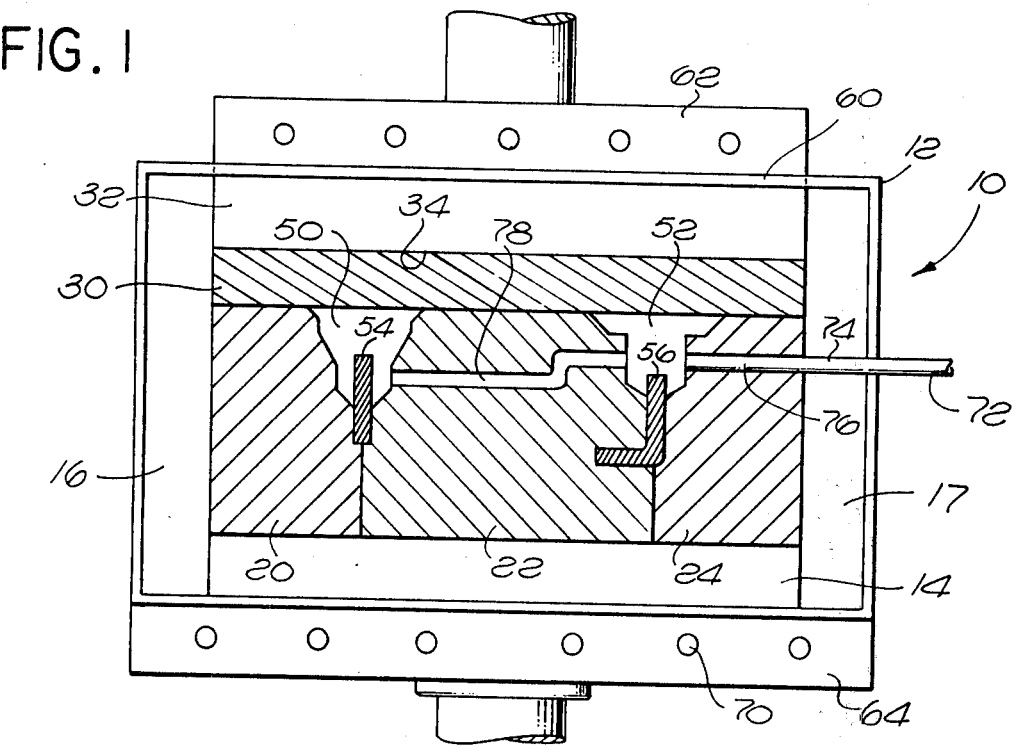
FIG. 1 is a cross-sectional elevational view of the basic forming and bonding apparatus employed in the present method of making a metallic structure by flow forming with concurrent bonding showing the preform and the workpieces in the initial position.

Referring now to FIG. 1, there is shown an example of a forming apparatus generally indicated at 10 for carrying out the present invention. A retort 12 is preferably provided as a housing for forming apparatus 10. Within the retort 12 is optimally provided a baseplate 14 and vertically extending support frames 16 and 17 positioned on opposite sides of baseplate 14. Additional support frames (not shown) could be provided as where there would be four separate support frames, each being positioned on the respective sides of baseplate 14.

Positioned on baseplate 14 between frame members 16 and 17 are preferably a plurality of dies or shaping members 20, 22, and 24. While it is preferred to use a plurality of segmented dies as shown, a single integral die could equivalently be used. However, using a plurality of dies as shown in FIG. 1 facilitates set-up and disassembly of the forming apparatus and removal of the fabricated metallic structure therefrom.

A primary consideration in selection of a suitable shaping member alloy is reactivity with the metal or metals to be formed at forming temperature. When the metal to be formed is titanium or an alloy thereof, iron based alloys with low nickel content and modest carbon content (as 0.2-0.5% carbon) have been successful.

A preform 30 is preferably positioned over dies 20, 22, and 24 between support frames 16 and 17 and below a punch member (also considered a die or shaping member) 32. Shaping members 20 and 22 define a cavity 50 therebetween and shaping members 22 and 24 define a cavity 52 therebetween. Within grooves 50 and 52 there are provided metal workpieces 54 and 56 respectively (or a plurality in each groove if so desired) to which the metal preform 30 is to join.

Dies 20, 22, and 24, frame members 16 and 17, and punch 32 are designed and arranged to form a chamber 34 which is substantially complementary to the desired final shape of preform 30. While not shown, any of the aforementioned shaping members can have protuberances on its surface contacting preform 30 which in forming of preform 30 would act as a male die member. The metal workpieces 54 and 56 act as male die members in the forming of preform 30 and are of such a shape and positioned in such a manner that the desired final structure will result when the preform is flow formed and bonded to workpieces 54 and 56.

Preform 30 can be in a variety of forms such as billet, bar stock, sheet stock, plate stock, rod, pellets, or combinations of these forms. Preform 30 is optimally a wrought material as the flow forming process would normally not affect a working of the preform, i.e., no mechanical property improvement results. In FIG. 1 there is shown a plate stock preform 30 which normally would have a fairly substantial thickness such that superplastic forming utilizing a differential gas pressure would not be practical due to the large forming time required or where the desired final shape would be particularly difficult for such a process. Any metal capable of sufficient plastic deformation under compressive pressure at obtainable economical temperatures, but preferably one that exhibits suitable superplastic properties, can be used for preform 30, but the present invention is particularly concerned with such metals that are subject to contamination at forming temperatures, such as titanium or an alloy thereof such as Ti-6A1-4V. The advantage of a superplastic material is that the flow stresses are lower at lower strain rates which can thereby often permit reduced pressures to cause flow forming (albeit at lower strain rates).

The extent to which any material selected will exhibit superplastic properties is predictable in general terms from a determination of its strength and strain rate sensitivity and a design determination of the permissable variation in wall thickness. Strain rate sensitivity can be defined as m where $$m = \frac{d\ln\sigma}{d\ln\dot\epsilon}$$

and δ is stress in pounds per square inch and ε is strain rate in reciprocal minutes. Strain rate sensitivity may be determined by a simple and now well recognized torsion test described in the article: "Determination of Strain-Hardening Characteristics by Torsion Testing," by D. S. Fields, Jr. and W. A. Backofen, published in the proceedings of the ASTM, 1957, Volume 57, Pages 1259-1279. A strain rate sensitivity of about 0.5 or greater can be expected to produce satisfactory results, with the larger the value (to a maximum of 1) the greater the superplastic properties.

The initial thickness of preform 30 is determined by the dimensions of the part to be formed. The selection of the material for preform 30 should also take into consideration certain variables which have been found to affect strain rate sensitivity of the flow stress. Decreasing grain size results in correspondingly higher values for strain rate sensitivity and lower available flow stresses. Additionally, strain rate and material texture affect the strain rate sensitivity.

Metal workpieces 54 and 56 can be of any desired shape or material, provided that it is subject to being metallurgically bonded to the metal preform, such as by diffusion bonding or brazing. In the FIG. 1 embodiment, it is not required that the metal workpieces 54 and 56 to have flow forming characteristics because they are not being formed. However, as discussed hereinafter with reference to FIGS. 3 and 4, it may be desirable for the metal workpieces to have such characteristics and optimally be of a superplastic material. It should also be noted that different materials for the metal workpieces 54 and 56 and the preform 30 may be used, although the joint strength would be expected to vary depending on the combination of materials used. In such cases, an interleaf material may be necessary or advisable between dissimilar metals.

Once the preform and forming apparatus have been properly arranged relative to one another within retort 12 and the lid 60 of retort 12 sealed, as by welding it shut, forming apparatus 10 is placed in a press between press platens 62 and 64. In the FIG. 1 embodiment, platen 64 acts as a support for the forming apparatus and prevents movement of the forming apparatus while pressure is applied by platen 62 to compress preform 30. Suitable retaining members (not shown) are provided along the lateral sides of the retort 12 to prevent movement of the forming apparatus in any of those directions.

Maximum strain rate sensitivity in metals is seen to occur, if at all, as metals are deformed near the phase transformation temperature, which varies with parameters such as grain structure and composition of the preform. Accordingly, the temperature immediately below the phase transformation temperature can be expected to produce the greatest strain rate sensitivity. For titanium and its alloys, the temperature range which superplasticity and optimal flow forming characteristics can be observed is about 1450° F. to about 1850° F. depending upon the specific alloy used. For Ti-6A1-4V, a temperature of about 1700° F. is normally used.

Various heating methods can be used for heating the preform 30 to the desired forming temperature (where the metal would be in a plastic state capable of flow forming). One particularly advantageous arrangement is illustrated in FIG. 1. There platens 62 and 64 are preferably made of a ceramic material and provided with resistance heated wires 70. Heat from the resistance wires 70 is transmitted through the retort 12, baseplate 14, dies 20, 22, and 24, and punch 32 to preform 30 and metallic workpieces 54 and 56. As tooling frames 16 and 17, dies 20, 22, and 24, and punch 34 are also by this method heated to the forming temperature, the areas of the preform 30 and workpieces 54 and 56 contacted by these other members during forming do not have their temperature substantially affected.

Optimally, the temperature used for forming of preform 30 would also be within a range where bonding of the metal workpieces 54 and 56 to preform 30 could take place. Alternatively, the temperature could be varied after the forming of the preform 30 such that bonding of workpieces 54 and 56 to preform 30 could take place.

Bonding of the preform 30 to the workpieces 54 and 56 is preferably accomplished by diffusion bonding. Diffusion bonding refers to the metallurgical joining of surfaces of similar or dissimilar metals by applying heat and pressure for a time duration so as to cause comingling of the atoms at the joint interface. Diffusion bonding is accomplished entirely in the solid state at or above one-half the base metal melting point (absolute). Actual times, temperatures, and pressures will vary from metal to metal. However, for Ti-6A1-4V, a temperature of about 1700° F. is normally used. Other forms of metallurgical bonding such as brazing could be used. If brazing was selected to be the joining method, a suitable brazing material would have to overlie the portions of the metallic workpieces 54 and 56 which are to bond to the preform 30.

Where the preform 30 or metal workpieces 54 and 56 are made up of a metal or alloy which would be subject to contamination at the temperatures required for flow forming or bonding, an environmental control system can be provided. Such a system would expose the preform 30 and metal workpieces 54 and 56 only to inert gas, such as argon, or a vacuum while heating and forming. Preform 30 and workpieces 54 and 56 will not react with the inert gas due to the nature of the inert gas, even at elevated forming and bonding temperatures. In a high vacuum, there are substantially no elements for the preform 30 or workpieces 54 and 56 to react with. Thus, in either environment, contamination of the metal preform 30 or workpieces 54 and 56 will be prevented.

To accomplish environmental control, a line 72 is connected through retort 12 to an aligned lateral conduit 74 in tooling frame 17. A lateral conduit 76 extending through die member 24 connects with conduit 74. Lateral conduit 78 which extends through die member 22 is aligned with conduit 76 but spaced therefrom due to cavity 52.

Line 72 can be connected to a source (not shown) of vacuum and/or inert gas such that during heating, forming, and joining, air could be withdrawn from chamber 34 (which includes cavities 50 and 52) to provide a substantially contamination free vacuum environment around preform 30 and metal workpieces 54 and 56. Additionally, if desired, after such withdrawal of air, inert gas could be provided to the aforementioned conduits to flow to chamber 34 so that there would be an inert gas environment around the preform 30 and workpieces 54 and 56 during heating, forming, and bonding.

When such a contamination prevention or controlled environment system is utilized, it is desirable to seal the forming apparatus to prevent entrance into chamber 34 of any contaminating air. This is accomplished in a preferred manner illustrated in FIG. 1 by the use of retort 12, which is a completely sealed enclosure around the forming apparatus 10. Thus, by providing forming apparatus 10 with a housing made up of retort 12, a seal is effected when the lid 60 of retort 12 is suitably joined, as by welding, to the body of retort 12.

After the temperature of preform 30 is raised to the desired forming temperature, which optimally would also be suitable for the bonding of preform 34 to metallic workpieces 54 and 56, pressure is applied to preform 30 by the action of the press (not shown) through platens 62 and 64. Platen 64, which acts on the bottom of retort 12, and other suitable pressure applying mechanisms (not shown), which act on the lateral sides of retort 12, apply sufficient pressure to prevent movement of tooling members 16 and 17, and dies 20, 22, and 24 while platen 62 acts on the lid of retort 12 forcing punch 32 downward against preform 30, which is in a plastic state due to the elevated temperature. Such pressure acts to deform retort 12, so care should be taken to make sure that the seal is not lost due to such deformation (some sealing techniques, such as a sliding seal, may obviate this).

Figure 2:
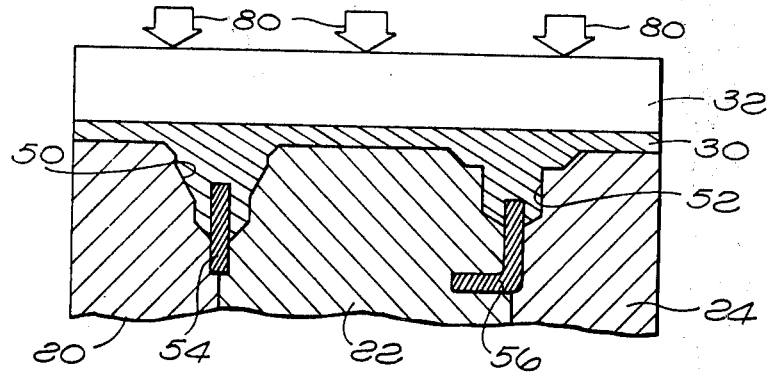
FIG. 2 is a cross-sectional diagramatic illustration of the forming and bonding apparatus showing the fully formed and bonded metallic structure which has been fabricated.

As shown in FIGS. 1 and 2, the pressure applied indicated by arrows 80 acts to compress preform 30 against die members 20, 22, and 24 while tooling frame members 16 and 17 prevent lateral deformation of preform 30 due to the pressure 80. Pressure 80 can vary and it depends upon many parameters such as the particular metal or alloy used for preform 30 and how formable and superplastic it is at the forming temperature, thickness of the preform 30, amount of deformation required for the preform 30, and desired time of the processing, etc. Applicants have found that for titanium and its alloys, and particularly the Ti-6A1-4V alloy, the range of pressure that can be used is 1500–3500 psi, with the preferred range being 2000–3000 psi, with the lower end of the range producing better results. Depending upon the configuration, this pressure is normally applied for four to five hours, but could be as low as one-half hour when simple shapes are to be fabricated.

Due to the compressive pressure 80, preform 30 deforms against dies 20, 22, and 24 with material flow into cavities or grooves 50 and 52. As the material flow of preform 30 proceeds further into cavities 50 and 52, it contacts workpieces 54 and 56 which act as male die members. As seen in FIG. 2, the preform 30 flows around those portions of workpieces 54 and 56 which protrude into cavities 50 and 52. By virtue of the intimate contact between the preform 30 and workpieces 54 and 56 and coordinated temperature-pressure-time duration conditions, bonding of the preform 30 to the workpieces 54 and 56 results (either directly as by diffusion bonding or indirectly as by brazing). Normally, the temperature at which the preform 30 is flow formed is suitable for bonding. However, the temperature could be varied after the flow forming of preform 30 if necessary for bonding. Similarly, the pressure for flow forming of the preform 30 is normally suitable for bonding of the preform 30 to workpieces 54 and 56, but can be varied if necessary after flow forming to effectuate the bonding. The pressure is maintained for a time duration sufficient to produce adequate bonding. This time will vary depending upon the metals being bonded, temperature, and pressure. Longer times, however, insure more complete bonding. Normally though, adequate bonding can be obtained in one to five hours when diffusion bonding Ti-6A1-4V at 1700° F. and 2000 psi.

Inert gas which may be in cavities 50 and 52 is vented through conduits 78, 76 and 74 to line 72 by deformation of the preform 30. The final formed structure is shown in FIG. 2. As can be seen, the final formed structure has a complex shape which with present state of the art methods would be quite difficult if not impossible to fabricate. The structure is unitary rather than a plurality of parts mechanically fastened. Further, by accomplishing both flow forming and bonding in one process and in one apparatus, a great deal of time and expense is saved.

Figures 3, 4:
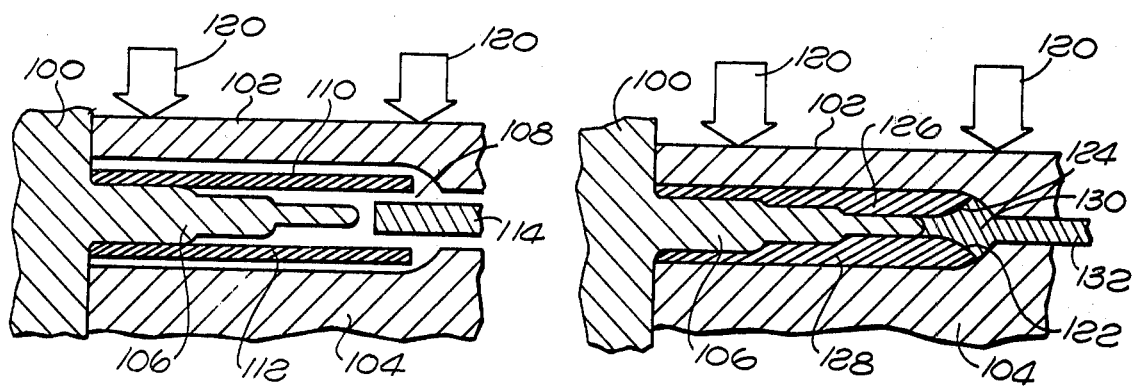
FIG. 3 is a cross-sectional diagramatic illustration of a second embodiment of the present invention illustrating the initial position of two preforms and a workpiece relative to the shaping members of the forming apparatus.
FIG. 4 is a cross-sectional diagramatic illustration of the FIG. 3 embodiment showing the resulting forming of the preforms and workpiece and the bonding of the component parts to one another of the fabricated metallic structure.

Referring now to FIGS. 3 and 4, another embodiment of the present invention is illustrated in diagramatic form. In this embodiment, a clevis-type joint is fabricated. Using applicants' process, the machining of deep slots normally required for this type of part is no longer necessary. Forming dies 100, 102, and 104 are machined to the shape desired. As shown, die 100 has a laterally extending protruding portion 106 of variable thickness which provides for the complex shaped deep slot having stepped joints. Protruding portion 106 of die 100 is positioned midway between dies 102 and 104. Within a chamber 108 defined by dies 100, 102, and 104 are positioned preform 110, preform 112, and workpiece 114. Preforms 110 and 112 and workpiece 114 are arranged relative to each other and shaping members 100, 102, and 104 such that the unitary part to be flow formed and joined will have the desired final shape.

As best seen in FIG. 4, the structure to be fabricated is achieved by the flow forming of preforms 110 and 112 and workpiece 114. Accordingly, workpiece 114 could be considered a "preform" (or vice versa for preforms 110 and 112), but is for convenience referred to as a workpiece. Workpiece 114 should be of an alloy suitable for flow forming in addition to being suitable for bonding to preforms 110 and 112. Optimally, the preforms 110 and 112 and workpiece 114 would be heated to a temperature range at which they all are capable of being flow formed. Pressure indicated by arrows 120 compresses preforms 110 and 112 and workpiece 114 against each other and dies 100, 102, and 104. This results in the flow forming of the preforms 110 and 112 and workpiece 114 to the desired shape and the metallurgical bonding shown along bond lines 122 and 124 when the pressure is maintained for the necessary time duration. Pressures and temperatures could of course be varied during the process to accomplish the desired result, i.e., where pressure 120 or the temperature must be varied to effect the bonding or for flow forming of either the preforms 110 and 112 or workpiece 114.

The final fabricated structure is shown in FIG. 4. As can be seen, this is a clevis-type structure having parallel legs 126 and 128 which define a deep stepped slot connected at a joint 130 which continues into a single oppositely extending leg 132.

While the illustrated embodiments of the invention utilize at least some flow forming prior to bonding, some structures may be fabricated using an opposite approach, i.e., where at least some (if not all) of the bonding would take place prior to flow forming of the preform (and workpieces where applicable).

Thus, it is apparent that there has been provided in accordance with the invention, a method of flow forming with combined bonding to make a metallic structure that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A method of making a metallic structure in a single operation by combined flow-forming and bonding comprising the steps of:
    providing a metal preform having flow-forming characteristics;
    providing first and second shaping members, the first shaping member having a groove therein;
    providing a metal workpiece to be joined to the preform, the workpiece being positioned in the groove;
    positioning the preform between the shaping members such that the preform overlies the first shaping member and the groove and separates the shaping members;
    heating the preform the within a temperature range suitable for flow-forming of the preform;
    applying compressive pressure through the shaping members to the preform sufficient to cause the preform to flow-form against the shaping members such that the preform deforms into the groove and against the workpiece; and
    diffusion bonding the preform to the workpiece by maintaining the preform and the workpiece under coordinated temperature-pressure-time duration conditions.

2. The method of claim 1 wherein the temperature range suitable for flow-forming of the preform is also suitable for diffusion bonding of the preform to the workpiece.

3. The method of claim 2 wherein the compressive pressure applied to the preform sufficient to cause the preform to flow-form is also suitable for diffusion bonding of the preform to the workpiece.

4. The method of claim 1 wherein the compressive pressure applied to the preform sufficient to cause the preform to flow-form is also suitable for diffusion bonding of the preform to the workpiece.

5. The method of claim 1 also including the step of adjusting the pressure to a magnitude sufficient for diffusion bonding of the preform to the workpiece.

6. The method of claim 1 also including the step of bringing the preform and the workpiece to within a temperature range suitable for diffusion bonding of the preform to the workpiece.

7. The method of claim 6 also including the step of adjusting the pressure to a magnitude sufficient for diffusion bonding of the preform to the workpiece.

8. The method of claim 7 wherein the metal workpiece has flow-forming characteristics, said heating is of the preform and the workpiece to within a temperature range suitable for flow-forming of the preform and the workpiece, and the deforming of the preform against the workpiece causes the workpiece to flow-form against the preform.

9. The method of claim 1 wherein the metal workpiece has flow-forming characteristics, said heating is of the preform and the workpiece to within a temperature range suitable for flow-forming of the preform and the workpiece, and the deforming of the preform against the workpiece causes the workpiece to flow-form against the preform.

* * * * *

UNITED STATES PATENT AND TRADEMARK OFFICE
CERTIFICATE OF CORRECTION

PATENT NO. : 4,141,484
DATED : FEBRUARY 27, 1979
INVENTOR(S) : C. Howard Hamilton and Leonard A. Ascani It is certified that error appears in the above-identified patent and that said Letters Patent are hereby corrected as shown below:

On the Title Page, beneath the ABSTRACT, delete the Figure illustrated and substitute Figure 1 of the drawings.

Signed and Sealed this

Thirtieth Day of October 1979

[SEAL]

Attest:

RUTH C. MASON
Attesting Officer

LUTRELLE F. PARKER
Acting Commissioner of Patents and Trademarks